US006971331B1

(12) United States Patent
Rohrer

(10) Patent No.: US 6,971,331 B1
(45) Date of Patent: Dec. 6, 2005

(54) WATER DISPENSING DEVICE, KIT AND METHOD

(76) Inventor: Michael W. Rohrer, 1920 Osage Cir., South Lake Tahoe, CA (US) 96150

( * ) Notice: Subject to any disclaimer, the term of this patent is extended or adjusted under 35 U.S.C. 154(b) by 0 days.

(21) Appl. No.: 10/841,360

(22) Filed: May 7, 2004

(51) Int. Cl.[7] ............................ A01K 7/00; B67D 5/06

(52) U.S. Cl. .......................... 119/77; 119/72; 119/52.1; 119/61.54; 222/185.1; 222/557

(58) Field of Search ............................ 222/185.1, 557; 119/77, 72, 74, 75, 76, 78, 79, 80, 61.54, 119/51.5, 52.1, 53, 53.5; D30/121, 122, 129–133

(56) References Cited

U.S. PATENT DOCUMENTS 367,456 A * 8/1887 Speicher ...................... 119/75
958,528 A * 5/1910 Pereboom ................... 137/409
1,398,041 A * 11/1921 Pfeifer ...................... 119/52.1
1,481,683 A * 1/1924 Bump ......................... 119/73
2,086,341 A * 7/1937 Tolley ......................... 119/77
3,498,268 A * 3/1970 Langevin et al. ........ 119/61.54
3,598,276 A * 8/1971 Brown ....................... 220/831
3,749,063 A 7/1973 Buffum
4,134,365 A * 1/1979 Futers et al. ............... 119/51.5
4,573,434 A * 3/1986 Gardner ....................... 119/77
D316,382 S * 4/1991 Lorenzana et al. ........ D11/164
5,297,504 A 3/1994 Carrico
5,365,879 A * 11/1994 Ying-Kuan .................. 119/54
5,488,927 A * 2/1996 Lorenzana et al. ........ 119/51.5
5,738,039 A * 4/1998 Berman et al. ............... 119/77
5,809,934 A 9/1998 Gavet
D406,926 S 3/1999 Kolozsvari
5,960,742 A 10/1999 O'Rourke et al.
5,979,361 A * 11/1999 Willinger ................. 119/61.54
6,079,361 A 6/2000 Bowell et al.
6,142,100 A * 11/2000 Marchioro ................... 119/54
6,467,428 B1 * 10/2002 Andrisin et al. ........... 119/51.5
6,516,747 B1 * 2/2003 Willinger ................. 119/61.54
6,718,911 B2 * 4/2004 Greenberg ................. 119/51.5
2004/0083646 A1 * 5/2004 Bielen ........................ 47/40.5

FOREIGN PATENT DOCUMENTS

GB 2241633 A * 9/1991 ............ A01K 7/02

* cited by examiner

*Primary Examiner*—Peter M. Poon
*Assistant Examiner*—Andrea M. Valenti

(57) ABSTRACT

A water dispensing device, an associated kit and a method of using same are disclosed for use in hydrating a pet such as a dog or cat. The water dispensing device includes a base unit slidably attached to a storage vessel. The base unit includes the interconnected constituents of a housing; a frame wall; and a door. The storage vessel includes the interconnected constituents of a flip top; a hollow body; and a hollow outlet port. The kit includes the unattached elements of the device. The method of using same includes the steps of adjoining, affixing, closing, grabbing, joining, letting, obtaining, opening, plugging, pouring, pushing, and releasing.

19 Claims, 4 Drawing Sheets

WATER DISPENSING DEVICE, KIT AND METHOD

FIELD OF THE INVENTION

The present invention relates to pet watering devices and, more particularly, to an improved water dispensing device, an associated kit and a method of using same for use in providing a convenient means for hydrating a pet such as a dog or a cat without undue spillage of water.

BACKGROUND OF THE INVENTION

All animals, including domestic pets, require water for survival. Typically, the owner of a pet need only maintain a water bowl to provide for pet sustenance. However, transportation of a pet creates peculiar circumstances that do not lend themselves to the conventional water bowl. In addition, transportation places most pets under stress causing an increase in water consumption.

A wide variety of water dispensing devices is currently available on the commercial market and an even larger number of these types of devices are known in the art of water dispensing devices, for example, the feeder dish for traveling animals disclosed by Buffum in U.S. Pat. No. 3,749,063; the pet water saver disclosed by Carrico in U.S. Pat. No. 5,297,504; the automatic portable drinking device for animals disclosed by Gavet in U.S. Pat. No. 5,809,934; the portable canine water dispenser and drinking device disclosed by O'Rourke et al. in U.S. Pat. No. 5,960,742; the animal watering system and methods disclosed by Bowell et al. in U.S. Pat. No. 6,079,361; and the water dispenser for a pet disclosed by Kolozsvari in U.S. Pat. No. D406,926.

While all of the above-described devices fulfill their respective, particular objectives and requirements, the aforementioned patents do not describe a water dispensing device having a base unit slidably attached to a storage vessel in which the base unit includes the interconnected constituents of a housing; a frame wall; and a door; wherein the storage vessel includes the interconnected constituents of a flip top; a hollow body; and a hollow outlet port. This combination of elements would specifically match the user's particular individual needs of making it possible to conveniently hydrate a pet such as a dog or a cat without undue spillage of water. The above-described patents make no provision for a water dispensing device having a base unit slidably attached to a storage vessel in which the base unit includes the interconnected constituents of a housing; a frame wall; and a door; wherein the storage vessel includes the interconnected constituents of a flip top; a hollow body; and a hollow outlet port.

Therefore, a need exists for a new and improved water dispensing device having a base unit slidably attached to a storage vessel in which the base unit includes the interconnected constituents of a housing; a frame wall; and a door; wherein the storage vessel includes the interconnected constituents of a flip top; a hollow body; and a hollow outlet port. In this respect, the water dispensing device according to the present invention substantially departs from the conventional concepts and designs of the prior art, and in doing so provides an apparatus primarily developed for the purpose of providing a convenient means for hydrating a pet such as a dog or a cat without undue spillage of water.

SUMMARY OF THE INVENTION

The present device, kit and method of using, according to the principles of the present invention, overcomes the shortcomings of the prior art by providing a novel and nonobvious water dispensing device, kit and method of using the same. The water dispensing device includes a base unit slidably attached to a storage vessel. The base unit includes the interconnected constituents of a housing; a frame wall; and a door. The storage vessel includes the interconnected constituents of a flip top; a hollow body; and a hollow outlet port. The kit includes the unattached elements of the device. The method of using same includes the steps of adjoining, affixing, closing, grabbing, joining, letting, obtaining, opening, plugging, pouring, pushing, and releasing.

In view of the foregoing disadvantages inherent in the known type water dispensing devices now present in the prior art, the present invention provides an improved water dispensing device, which will be described subsequently in great detail, is to provide a new and improved water dispensing device which is not anticipated, rendered obvious, suggested, or even implied by the prior art, either alone or in any combination thereof.

To attain this, the present invention essentially comprises a <synopsis of claim 1>

There has thus been outlined, rather broadly, the more important features of the invention in order that the detailed description thereof that follows may be better understood, and in order that the present contribution of the art may be better appreciated.

The invention may also include a gasket. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved water dispensing device that has all the advantages of the prior art water dispensing device and none of the disadvantages.

It is another object of the present invention to provide a new and improved water dispensing device that may be easily and efficiently manufactured and marketed.

An even further object of the present invention is to provide a new and improved water dispensing device that has a low cost of manufacture with regard to both materials and labor, and which accordingly is then susceptible of low prices of sale to the consuming public, thereby making such multipurpose storage unit and system economically available to the buying public.

Still another object of the present invention is to provide a new water dispensing device that provides in the apparatuses and methods of the prior art some of the advantages thererof, while simultaneously overcoming some of the disadvantages normally associated therewith.

Even still another object of the present invention is to provide a water dispensing device having a base unit slidably attached to a storage vessel in which the base unit includes the interconnected constituents of a housing; a frame wall; and a door; wherein the storage vessel includes the interconnected constituents of a flip top; a hollow body; and a hollow outlet port. This combination of elements makes it possible to conveniently hydrate a pet such as a dog or a cat without undue spillage of water.

Still another object of the present invention is to provide a kit comprising the unassembled components of the device.

Lastly, it is an object of the present invention to provide a new and improved method of using comprising the steps of adjoining, affixing, closing, grabbing, joining, letting, obtaining, opening, plugging, pouring, pushing, and releasing.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and description matter in which there are illustrated preferred embodiments of the invention.

BRIEF DESCRIPTION OF THE DRAWINGS

The invention will be better understood and objects other than those set forth above will become apparent when consideration is given to the following detailed description there of. Such description makes reference to the annexed drawings wherein.

DETAILED DESCRIPTION OF THE PREFERRED EMBODIMENT

Figure 1:
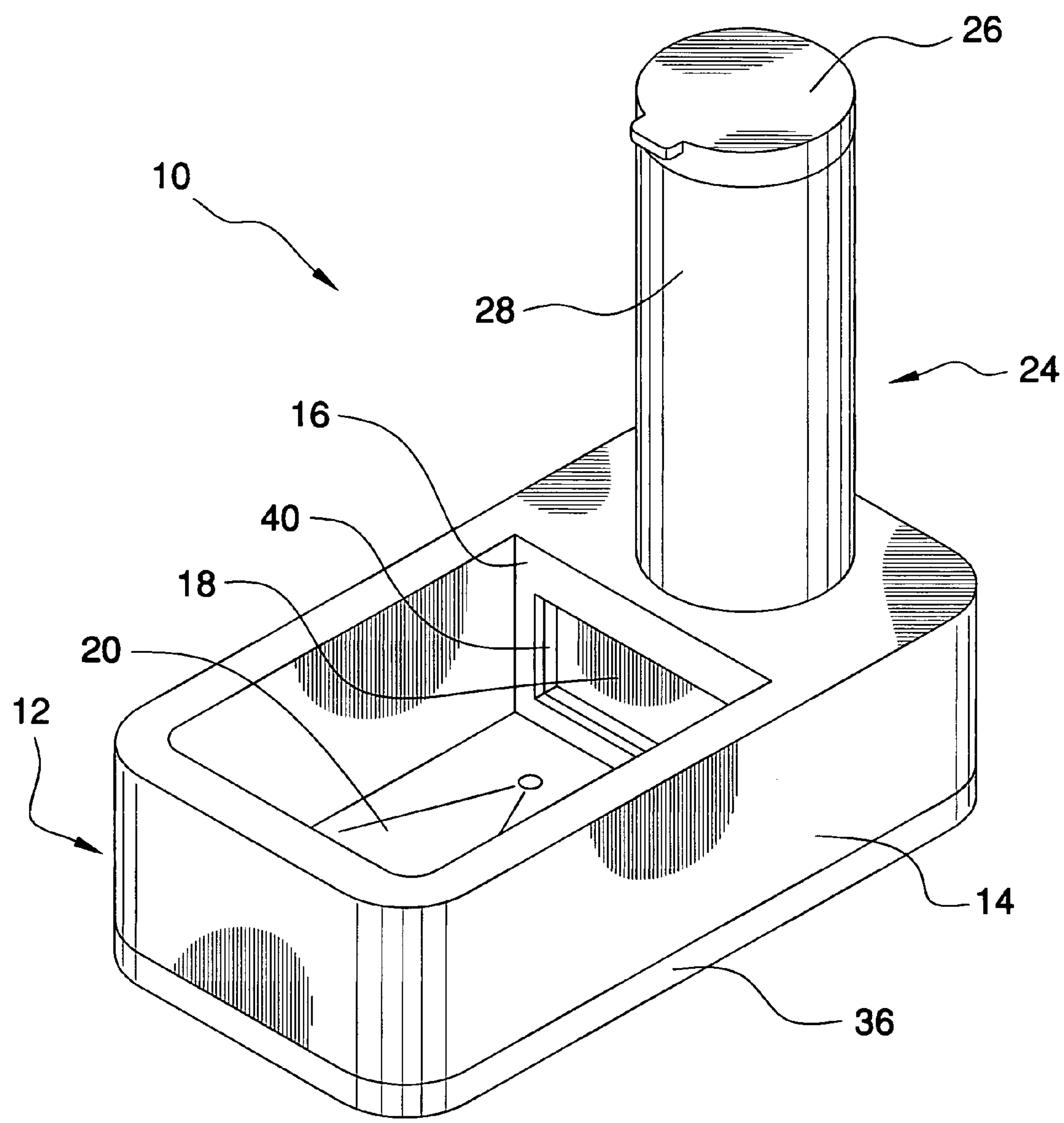
FIG. 1 is a perspective view of an preferred embodiment of the water dispensing device constructed in accordance with the principles of the present invention.
Figure 2:
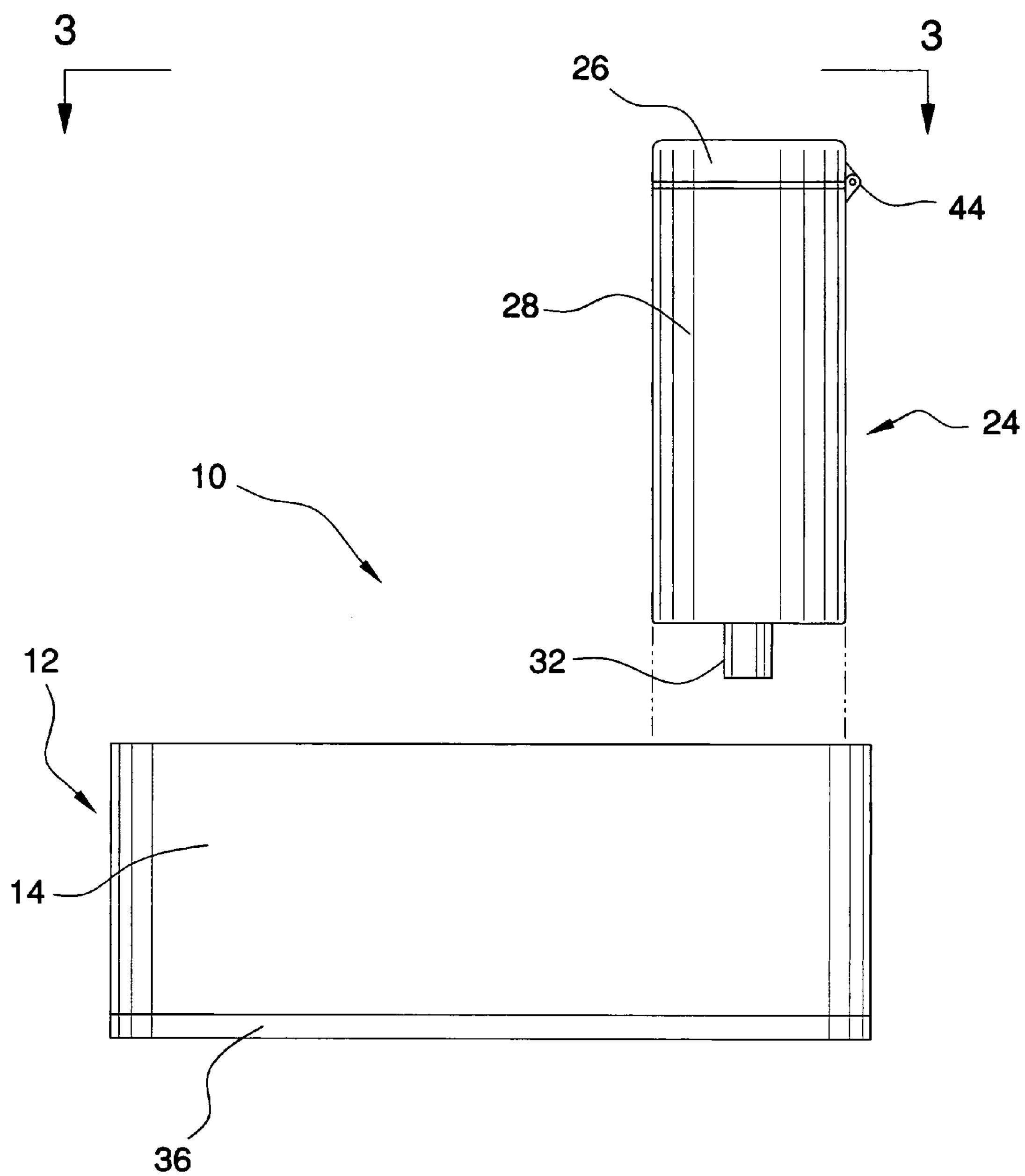
FIG. 2 is a side exploded view of a preferred embodiment of the water dispensing device of the present invention.
Figure 3:
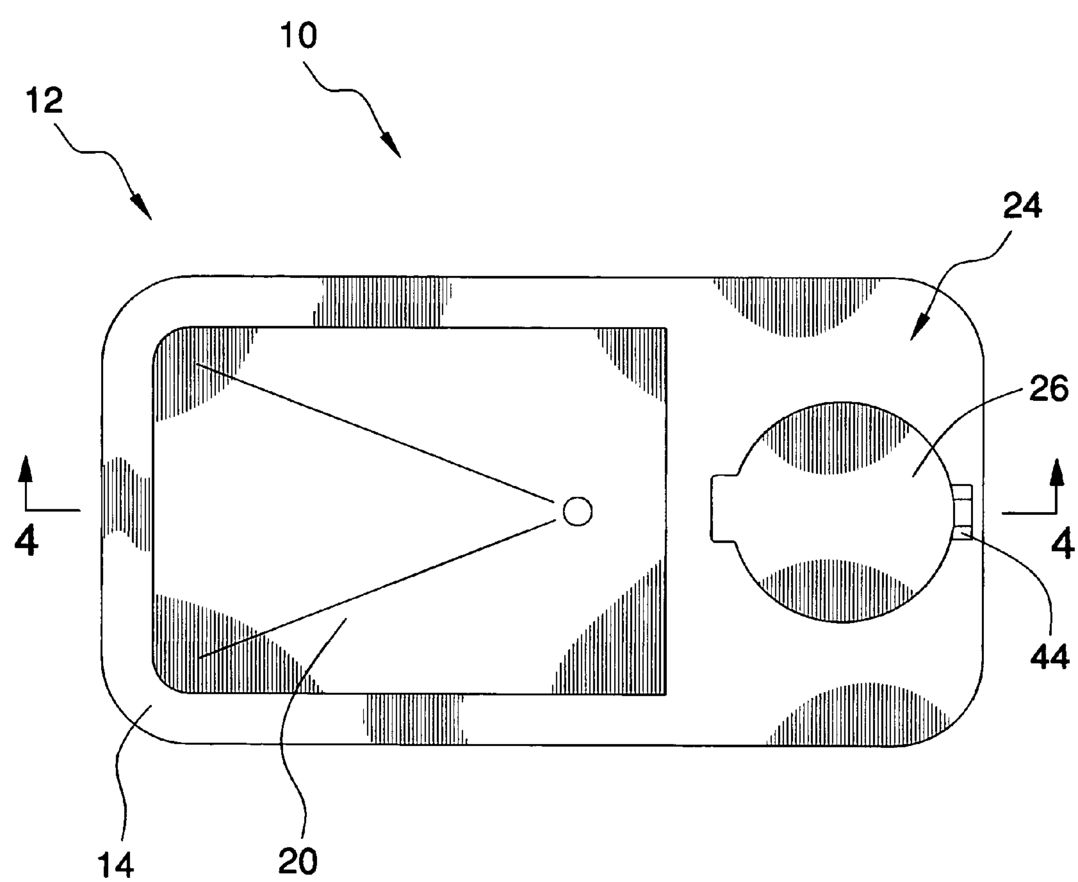
FIG. 3 is a top view of a preferred embodiment of the water dispensing device of the present invention.
Figure 4:
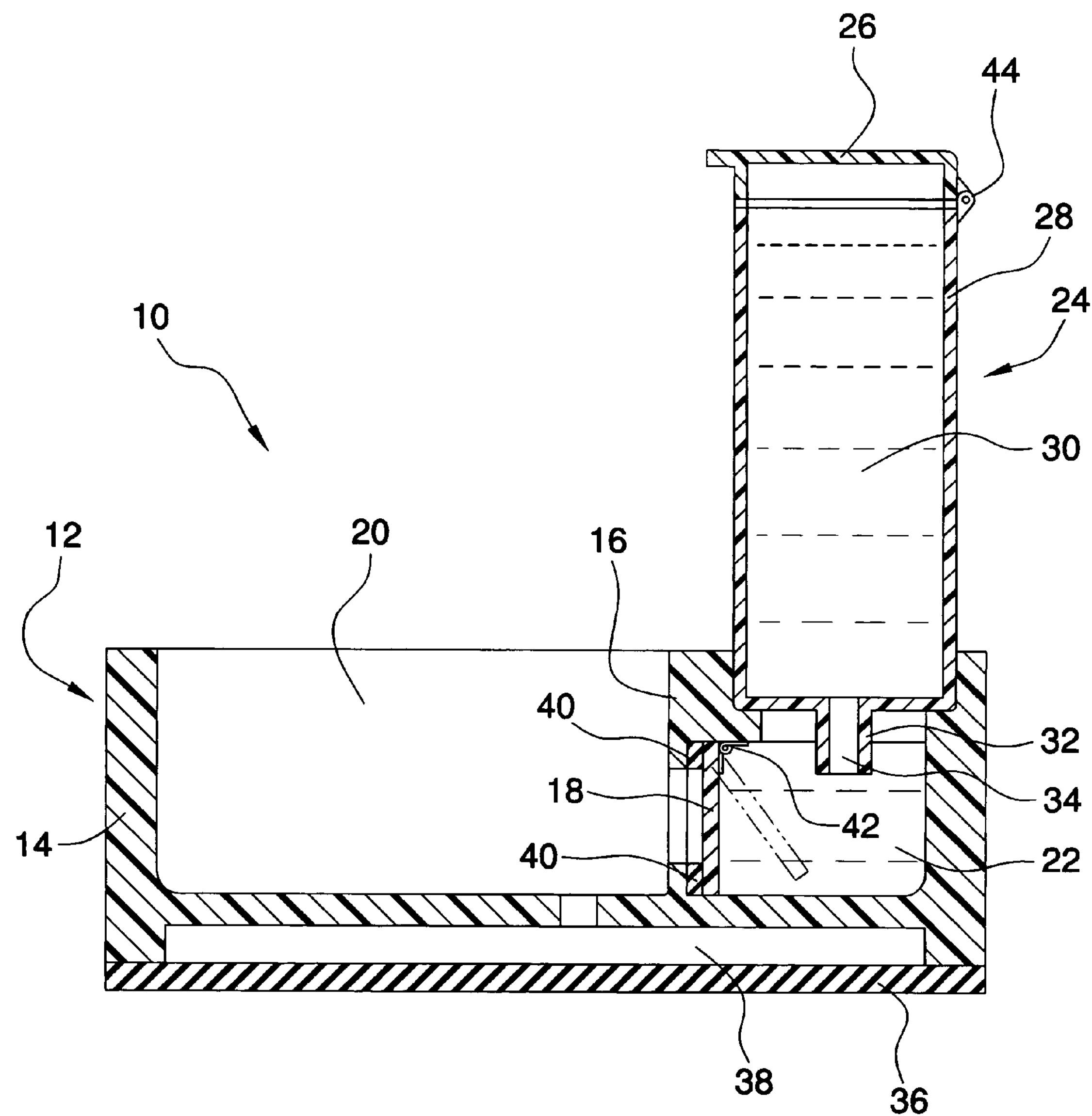
FIG. 4 is a cross sectional side view of a preferred embodiment of the water dispensing device of the present invention. The same reference numerals refer to the same parts throughout the various figures.

Referring now to the drawings, and in particular FIGS. 1 to 4 thereof, one preferred embodiment of the present invention is shown and generally designated by the reference numeral 10. One preferred embodiment of a water dispensing device 10 for hydrating pets, the device 10 comprises a base unit 12 slidably attached to a storage vessel 24. The base unit 12 includes a housing 14; a frame wall 16; and a door 18. The frame wall 16 is attached to the housing 14. The door 18 is pivotally attached to the frame wall 16, wherein the door 18, the frame wall 16, and the housing 14 defining an open reservoir 20 and a closed reservoir 22. When the door 18 is pivoted away from the frame wall 16 then the open reservoir 20 is in fluid communications with the closed reservoir 22. When the door 18 is pivoted towards then the frame wall 16 the open reservoir 20 is not in fluid communications with the closed reservoir 22. The storage vessel 24 includes: a flip top 26; a hollow body 28; and a hollow outlet port 32. The hollow body 28 is pivotally attached to the flip top 26, the hollow body 28 also has a holding reservoir 30. The hollow outlet port 32 is attached to the hollow body 28, in which the hollow outlet port 32 has an internal fluid passage 34 in fluid communications with the holding reservoir 30 of the hollow body 28. When the storage vessel 24 is slidably attached to the base unit 12 then the holding reservoir 30 is in fluid communications with the closed reservoir 22.

An optional pad 36 may be added to the device 10 in which the optional pad 36 is attached to the housing 14. The pad 36 may be made of any commercially available material. One preferred configuration is that the pad 36 is made of plastic selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

An optional counterweight 38 may be added to the device 10 in which the optional counterweight 38 is attached to the pad 36 and attached to the housing 14. The counterweight 38 may be made of any commercially available material. One preferred configuration is that the counterweight 38 is made of metal selected from the group consisting of lead, copper, iron, steel, stainless steel, manganese, magnesium, vanadium, nickel, tungsten, and molybdenum.

An optional gasket 40 may be added to the device 10 in which the optional gasket 40 is attached to the frame wall 16. The gasket 40 may be made of any commercially available material. One preferred configuration is that the gasket 40 is made of plastic selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

An optional spring hinge 42 may be added to the device in which the optional spring hinge 42 is attached to the frame wall 16 and attached to the door 18.

An optional angle hinge 44 may be added to the device in which the optional angle hinge 44 is attached to the flip top 26 of the storage vessel 24 and attached to the hollow body 28 of the storage vessel 24.

The housing 14 may be made of any commercially available material such as plastic selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

The storage vessel 24 may be made of any commercially available material such as plastic selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

The base unit 12 may be made of any commercially available material such as plastic selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

One preferred embodiment of a kit for a water dispensing device 10, the kit comprising: a base unit 12 and a storage vessel 24. The base unit 12 including: a housing 14; a frame wall 16 attached to the housing 14; and a door 18 pivotally attached to the frame wall 16, wherein the door 18, the frame wall 16, and the housing 14 defining an open reservoir 20 and a closed reservoir 22, when the door 18 is pivoted away from the frame wall 16 then the open reservoir 20 is in fluid communications with the closed reservoir 22, when the door 18 is pivoted towards then the frame wall 16 the open reservoir 20 is not in fluid communications with the closed reservoir 22; and a storage vessel 24 slidably attachable to the base unit 12. The storage vessel 24 including: a flip top 26; a hollow body 28 pivotally attached to the flip top 26, the hollow body 28 having a holding reservoir 30; and a hollow outlet port 32 attached to the hollow body 28, the hollow outlet port 32 having an internal fluid passage 34 in fluid communications with the holding reservoir 30 of the hollow body 28, wherein when the storage vessel 24 is slidably attached to the base unit 12 then the holding reservoir 30 is in fluid communications with the closed reservoir 22.

An optional a pad 36 attachable to the housing 14 may be added to the kit.

An optional counterweight 38 attachable to the base unit 12 may be added to the kit.

An optional gasket 40 attachable to the frame wall 16 may be added to the kit.

One preferred embodiment of a method of using a kit for assembling and utilizing a water dispensing device 10, the method comprising the steps of: adjoining, affixing, closing, grabbing, joining, letting, obtaining, opening, plugging, pouring, pushing, and releasing. The obtaining step comprises obtaining the kit comprising: a base unit 12 including: a housing 14; a frame wall 16 attached to the housing 14; a door 18 pivotally attached to the frame wall 16, wherein the door 18, the frame wall 16, and the housing 14 defining an open reservoir 20 and a closed reservoir 22, when the door 18 is pivoted away from the frame wall 16 then the open reservoir 20 is in fluid communications with the closed reservoir 22, when the door 18 is pivoted towards then the frame wall 16 the open reservoir 20 is not in fluid communications with the closed reservoir 22; a storage vessel 24 slidably attachable to the base unit 12, the storage vessel 24 including: a flip top 26; a hollow body 28 pivotally attached to the flip top 26, the hollow body 28 having a holding reservoir 30; and a hollow outlet port 32 attached to the hollow body 28, the hollow outlet port 32 having an internal fluid passage 34 in fluid communications with the holding reservoir 30 of the hollow body 28, wherein when the storage vessel 24 is slidably attached to the base unit 12 then the holding reservoir 30 is in fluid communications with the closed reservoir 22 a pad 36 attachable to the housing 14; a counterweight 38 attachable to the pad 36 and attachable to the base unit 12; and a gasket 40 attachable to the frame wall 16. The adjoining step comprises adjoining the counterweight 38 to the base unit 12. The affixing step comprises affixing the pad 36 to the counterweight 38 and to the base unit 12. The grabbing step comprises grabbing hold of the storage vessel 24. The opening step comprises opening pivotally the flip top 26 from the hollow body 28 of the storage vessel 24. The plugging step comprises plugging the hollow outlet port 32 with a finger. The pouring step comprises pouring water into the hollow body 28 of the storage vessel 24 while the flip top 26 is pivoted open and while the hollow outlet port 32 is plugged. The closing step comprises closing pivotally the flip top 26 around the hollow body 28 of the storage vessel 24 while the hollow outlet port 32 is plugged. The releasing step comprises releasing the finger from the hollow outlet port 32. The joining step comprises joining slidably together the storage vessel 24 to the base unit 12, whereby the holding reservoir 30 of the hollow body 28 is in fluid communications with the closed reservoir 22. The pushing step comprises pushing pivotally the door 18 with the finger when the storage vessel 24 is slidably joined together with the base unit 12, whereby the open reservoir 20 is in fluid communications with the closed reservoir 22. The letting step comprises letting go of the door 18 with the finger when the storage vessel 24 is slidably joined together with the base unit 12 whereby the open reservoir 20 is not in fluid communications with the closed reservoir 22.

As to the manner of usage and operation of the present invention, the same should be apparent from the above description. Accordingly, no further discussion relating to the manner of usage and operation will be provided.

While a preferred embodiment of the water dispensing device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes" or variations, thereof, or the term "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A water dispensing device for hydrating pets, said device comprising:

- a base unit including:
  - a housing;
  - a frame wall attached to said housing; and
  - a door pivotally attached to said frame wall, wherein said door, said frame wall, and said housing defining an open reservoir and a closed reservoir, when said door is pivoted away from said frame wall said open reservoir is in fluid communications with said closed reservoir, when said door is pivoted towards said frame to a closed position, said open reservoir is not in fluid communication with said closed reservoir and a longitudinal axis of said door is in a vertical orientation; and
- a storage vessel slidably attached to said base unit, said storage vessel including:
  - a flip top;
  - a hollow body pivotally attached to said flip top, said hollow body having a holding reservoir; and
  - a hollow outlet port attached to said hollow body, said hollow outlet port having an internal fluid passage in fluid communications with said holding reservoir of said hollow body, wherein when said storage vessel is slidably attached to said base unit then said holding reservoir is in fluid communications with said closed.

2. The device of claim 1 further comprising a pad attached to said housing.

3. The device of claim 2 further comprising an angle hinge attached to said flip top of said storage vessel and attached to said hollow body of said storage vessel.

4. The device of claim 2 wherein said pad is made of plastic.

5. The device of claim 4 wherein said plastic is selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

6. The device of claim 1 further comprising a counterweight attached to said pad and attached to said housing.

7. The device of claim 6 wherein said counterweight is made of metal.

8. The device of claim 7 wherein said metal is selected from the group consisting of lead, copper, iron, steel, stainless steel, manganese, magnesium, vanadium, nickel, tungsten, and molybdenum.

9. The device of claim 1 further comprising a gasket attached to said frame wall.

10. The device of claim 9 wherein said gasket is made of plastic selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

11. The device of claim 1 further comprising a spring hinge attached to said frame wall and attached to said door.

12. The device of claim 1 wherein said housing is made of plastic.

13. The device of claim 12 wherein said plastic is selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

14. The device of claim 1 wherein said storage vessel is made of plastic.

15. The device of claim 14 wherein said plastic is selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

16. The device of claim 1 wherein said base unit is made of plastic.

17. The device of claim 16 wherein said plastic is selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

18. A kit for a water dispensing device, said kit comprising:

- a base unit including:
  - a housing;
  - a frame wall attached to said housing; and
  - a door pivotally attached to said frame wall, wherein said door, said frame wall, and said housing defining an open reservoir and a closed reservoir, when said door is pivoted away from said frame wall then said open reservoir is in fluid communications with said closed reservoir, when said door is pivoted towards said frame to a closed position said open reservoir is not in fluid communication with said closed reservoir and a longitudinal axis of said door is in a vertical orientation; and a storage vessel slidably attachable to said base unit, said storage vessel including:

a flip top;

a hollow body pivotally attached to said flip top, said hollow body having a holding reservoir; and a hollow outlet port attached to said hollow body, said hollow outlet port having an internal fluid passage in fluid communications with said holding reservoir of said hollow body, wherein when said storage vessel is slidably attached to said base unit then said holding reservoir is in fluid communications with said closed reservoir.

19. The kit of claim 18 further comprising:

a pad attachable to said housing;

a counterweight attachable to said pad and attachable to said base unit; and a gasket attachable to said frame wall.

* * * * *